United States Patent
Lupke et al.

(10) Patent No.: US 7,214,051 B2
(45) Date of Patent: May 8, 2007

(54) DEVICE FOR MANUFACTURING A DOUBLE-WALLED THERMOPLASTIC PIPE WITH A CONNECTING SLEEVE

(75) Inventors: Manfred Arno Alfred Lupke, Thornhill (CA); Stefan A. Lupke, Thornhill (CA)

(73) Assignee: Manfred A.A. Lupke, Thornhill, Ontario (CA)

( * ) Notice: Subject to any disclaimer, the term of this patent is extended or adjusted under 35 U.S.C. 154(b) by 0 days.

(21) Appl. No.: 11/257,996

(22) Filed: Oct. 26, 2005

(65) Prior Publication Data

US 2006/0033244 A1 Feb. 16, 2006

Related U.S. Application Data

(63) Continuation of application No. PCT/IB2004/003361, filed on Jun. 23, 2004.

(30) Foreign Application Priority Data

Jul. 31, 2003 (DE) ................. 103 35 518

(51) Int. Cl.
*B29C 53/30* (2006.01)
(52) U.S. Cl. .................. 425/336; 425/325; 425/326.1; 425/380; 425/387.1; 425/396; 425/133.1
(58) Field of Classification Search ................ 425/336, 425/325, 326.1, 380, 387.1, 396, 133.1
See application file for complete search history.

(56) References Cited

U.S. PATENT DOCUMENTS 3,212,135 A 10/1965 Branscum (Continued)

FOREIGN PATENT DOCUMENTS

| DE | 101 10 064 A1 | 9/2002 |
|----|---------------|--------|
| EP | 0 563 575 A2 | 10/1993 |
| EP | 0 563 575 A3 | 12/1993 |
| EP | 0 995 579 A2 | 9/1999 |
| EP | 0 995 579 A3 | 5/2001 |
| FR | 2 718 509 A | 4/1994 |
| JP | 60-79936 | 5/1985 |
| JP | 2000-127220 | 5/2000 |
| WO | WO 85/02144 | 5/1985 |
| WO | WO 95/01251 | 1/1995 |

OTHER PUBLICATIONS

English Abstract of FR 2 718 509 A, The Thomson Corp., Jul. 5, 2005.
Taschenbuch Maschinenbau, Band 3, VEB-Verlag Technik Berlin, 1987, S. 553.
English translation of the International Preliminary Report on Patentability for PCT App. No. PCT/IB2004/003361, May 29, 2005.

*Primary Examiner*—Yogendra N. Gupta
*Assistant Examiner*—Maria Veronica Ewald
(74) *Attorney, Agent, or Firm*—Cahn & Samuels, LLP (57) ABSTRACT

A device for manufacturing a double-walled thermoplastic pipe with a connecting sleeve has a molding tunnel with a succession of molds for forming a corrugated molding wall and a connecting sleeve, respectively. An extrusion device extrudes a first flexible tube into said molding tunnel and a second flexible tube into said first flexible tube. A first gas channel is arranged for generating a pressure between said first and second flexible tubes. A compressed-gas control device is connected to said first gas channel for generating a pressure p1 or a pressure p2 in said space between said first and second flexible tubes by compressed air emerging from said first gas channel. A second compressed-gas control device is connected to a second gas channel for guiding compressed gas onto an inner side of said second flexible tube. Said first pressure controller is connected to said first gas channel via a compressed-gas line that is connected to an additional compressed-gas reservoir for gas exchange therewith.

26 Claims, 4 Drawing Sheets

U.S. PATENT DOCUMENTS

| | | |
|---|---|---|
| 4,365,948 A | 12/1982 | Chaplain |
| 4,500,284 A | 2/1985 | Lupke |
| 4,545,751 A | 10/1985 | Lupke |
| 4,555,230 A | 11/1985 | Lupke |
| 4,663,107 A | 5/1987 | Takada et al. |
| 4,741,795 A * | 5/1988 | Grace et al. ................ 156/247 |
| 4,808,098 A | 2/1989 | Chan et al. |
| 4,846,660 A | 7/1989 | Drossbach |
| 4,865,797 A | 9/1989 | Järvenkylä |
| 4,873,048 A | 10/1989 | Järvenkylä |
| 5,023,029 A | 6/1991 | Lupke |
| 5,296,188 A | 3/1994 | Lupke |
| 5,320,797 A * | 6/1994 | Hegler et al. ................ 264/511 |
| 5,405,569 A | 4/1995 | Lupke |
| 5,891,383 A | 4/1999 | Joseph |
| 6,015,282 A * | 1/2000 | Rahn .......................... 425/233 |
| 6,257,866 B1 * | 7/2001 | Fritz et al. ................ 425/387.1 |
| 6,458,311 B1 | 10/2002 | Hegler |
| 2004/0232579 A1 | 11/2004 | Lupke et al. |

* cited by examiner

DEVICE FOR MANUFACTURING A DOUBLE-WALLED THERMOPLASTIC PIPE WITH A CONNECTING SLEEVE

RELATED APPLICATION

This is a continuation application of International Patent Application PCT/IB2004/003361, filed Jun. 23, 2004, designating the United States and published in German as WO 2005/009720 A1, which claims priority to German patent application number 103 35 518.9, filed Jul. 31, 2003.

BACKGROUND OF THE INVENTION a. Field of the Invention

The invention relates to a device for manufacturing a double-walled thermoplastic pipe with a connecting sleeve.

b. Related Prior Art

A device of this type is known for example from DE 101 10 064 A1. The device has a number of molds guided on a path, which form a molding tunnel, which has in at least a first portion a corrugated molding wall and in at least a second portion a sleeve recess corresponding to the connecting sleeve. An extrusion head of the device has a first die for the extrusion of a first flexible tube into the molding tunnel and a second die, arranged downstream in the direction of movement of the molds in the molding tunnel, for the extrusion of a second flexible tube. Arranged between the two dies is a first gas channel, which is connected to a first compressed-gas control device for generating a pressure p1 or p2 in the space between the two tubes by the compressed gas emerging from the mouth of the first gas channel. A second gas channel, which opens out downstream of the second die in the direction of movement of the molds of the molding tunnel, is connected to a second compressed-gas control device, in order to generate a pressure p3, lying above atmospheric pressure, on the inner side of the second flexible tube by the compressed gas emerging from the mouth of the second gas channel. The two compressed-gas control devices are controlled in an open-loop or closed-loop manner by means of a control device.

With the device, the first flexible tube is extruded into the molding tunnel. In the first portion of the molding tunnel, the first flexible tube is brought into a corrugated form and, in the second portion of the molding tunnel, it is expanded to form the connecting sleeve. The second flexible tube is extruded into the first flexible tube and pressed against the corrugation troughs of the first flexible tube, so that a composite pipe comprising an outer tube and an inner tube fused with the latter is formed. While the first flexible tube is being brought into the corrugated form and the second flexible tube is being extruded into the first flexible tube, the space between the two tubes is subjected to a pressure p1 lying above atmospheric pressure (the space between the two flexible tubes is referred to hereafter as space A). The pressure p1 is set at such a level that, after the cooling of the flexible tubes fused together at the corrugation troughs, the inner tube is not curved inward or outward between these points. After the cooling of the flexible tubes, it is intended that atmospheric pressure will be established there. Moreover, the pressure p1 produces the corrugated form of the first flexible tube.

If the first flexible tube is to be expanded in the second portions to form the connecting sleeve, the pressure p2 is set in the space A. The pressure p2 must not be too low, otherwise the first flexible tube would not expand, or not expand adequately to form the connecting sleeve. If, on the other hand, the pressure p2 is too great, the first flexible tube is stretched during extrusion, so that it has a thinner wall thickness at the beginning of the formation of the connecting sleeve and a thicker wall thickness at the end of the connecting sleeve.

During the extrusion of the second flexible tube into the first flexible tube which has been expanded to form the connecting sleeve, the second flexible tube is subjected to a pressure p3 above atmospheric pressure from the inside and pressed against the first flexible tube. As a result, it is ensured that fusion of the two flexible tubes is achieved over their full surface area in the region of the connecting sleeve.

Once the connecting sleeve has been formed by the two flexible tubes and the second flexible tube is extruded again against the corrugation troughs of the first flexible tube in a further first portion of the same, the space A is again subjected to the pressure p1.

The closed-loop or open-loop control of the pressures p1, p2 and p3 takes on special significance, since curvatures of the inner flexible tube and/or irregularities in the wall thickness of the connecting sleeve can be avoided to the greatest extent by suitable setting of the pressures. In the case of the device described above, closed-loop control of the pressures p1 and p2, to which the space A is subjected, in particular proves to be difficult. This space is in this case bounded by the extrusion head and the two flexible tubes, it being intended that the first flexible tube either lies against the corrugated molding wall or against the sleeve recess. Since the diameter of the sleeve recess is greater than the diameter of the corrugated molding wall, the volume of the space A depends on the respective stage of the process. Consequently, the volume changes at the beginning and at the end of the manufacture of the connecting sleeve. In particular in the case of large pipe diameters, the changes in volume in the space A influence the pressures p1 and p2 to such an extent that maintaining them imposes very great demands on the pressure control.

Furthermore, the temperature in the space A also influences the pressure prevailing there. The temperature depends on the amounts of heat that are supplied to and removed from the space A. The amounts of heat in turn depend on the surface areas of the space A via which the amounts of heat are transferred. Consequently, the different form of the molds in the first portion (corrugated) and the second portion also influences the pressure prevailing in the space A.

SUMMARY OF THE INVENTION

Therefore, one object underlying the invention is to improve the device for manufacturing a double-walled thermoplastic pipe with a connecting sleeve in such a way that, in the first portion of the molding tunnel, a curvature of the inner tube is avoided during the cooling of the flexible tubes and, in the second portion of the molding tunnel, satisfactory expansion of the first flexible tube to form a connecting sleeve is made possible.

According to the invention, this and other objects are achieved with a device for manufacturing a double-walled thermoplastic pipe with a connecting sleeve, comprising a molding tunnel, an extrusion device provided with an extrusion head for extruding a first flexible tube and a second flexible tube into a molding tunnel, a first gas channel being arranged to supply gas into the space between the first and the second flexible tube, a compressive-gas control device connected to said first gas channel, whereby a pressure controller is connected to said first gas channel via a compressed-gas line that is connected to a compressor-gas reservoir for gas exchange.

Further, a pressure controller is connected to said first gas channel by a compressed-gas line which is connected to an additional compressed-gas reservoir for gas exchange. The compressed-gas reservoir can consequently communicate with the space A via the compressed-gas line and via the first gas channel. If, for example on account of an increase in volume of the space A, the pressure there drops, there is immediately a pressure equalization between space A and the compressed-gas reservoir, which attenuates the pressure drop in the space A. This makes it possible in a simple way to avoid to the greatest extent undesired pressure gradients in the space A, which would otherwise have to be equalized by the compressed-gas control device, which however would involve much more sophisticated closed-loop control. According to the invention, the pressure is controlled in a closed-loop or open-loop manner in a complete system, the volume of which is substantially made up by the volume of the space A and the volume of the compressed-gas reservoir. This leads to an evening-out of the pressure profile in the space A, so that in particular the undesired curvatures at the inner wall of the double-walled pipe can be avoided.

According to another object, the compressed-gas reservoir is formed as a separate vessel. Consequently, a compressed-gas line with customary flow cross sections can be used for the connection of the compressed-gas control device to the first gas channel, the size of the vessel determining the extent of the attenuation of the pressure changes in the space A. The additional compressed-gas reservoir may also be formed by the widening of the flow cross section of the compressed-gas line, at least in partial regions of the compressed-gas line.

The separate vessel is preferably connected to the compressed-gas line by a T-shaped sleeve. This allows a device known from the art to be modified in a simple way, in that the compressed-gas line provided there is cut and the T-shaped sleeve with a compressed-gas vessel is inserted there.

The compressed-gas vessel may be releasably connected to the T-sleeve. It is therefore possible, for example, in a trial phase of the device to analyze the influence of the size of the separate vessel on the quality of the pipe wall in a simple way, in order to determine the optimum vessel volume for the process.

The compressed-gas vessel may comprise two supply lines and be connected in series with the compressed-gas line. It is also possible to connect the compressed-gas vessel parallel to the compressed-gas line, that is to say to connect the compressed-gas vessel to the compressed-gas line by a bypass.

According to a further object, the compressed-gas reservoir is arranged in the vicinity of the first gas channel. An arrangement of this type allows the flow resistances between the compressed-gas reservoir and the space A to be minimized, so that a rapid pressure equalization can take place between the compressed-gas reservoir and the space A.

The compressed-gas control device preferably has a pressure gage, which is arranged upstream of the compressed-gas reservoir. Consequently, the pressure gage does not directly detect pressure equalizations between the compressed-gas vessel or reservoir and the space A, but only the pressure of the complete system, the volume of which is, as already described above, substantially made up by the volume of the compressed-gas reservoir and of the space A.

A safety valve may be connected between the compressed-gas control device and the first gas channel. The valve is preferably formed as a spring-actuated valve, which closes under a specific pressure. In this way it is possible to avoid inadmissible excess pressures in the space A, for example if there is a defect of the compressed-gas control device.

The outer diameter of the molding wall in the first portion, which corresponds to the pipe diameter of the pipe to be manufactured, may be greater than 500 mm, preferably greater than 800 mm. In particular in the case of large pipes, it has proven to be expedient to use the gas-pressure reservoir according to the invention. As the pipe diameter becomes greater, the volume decrease or increase for the space A becomes greater when a changeover is made from the manufacture of the connecting sleeve to the manufacture of the corrugated pipe wall or a changeover is made from the manufacture of the corrugated pipe wall to the manufacture of the connecting sleeve. As the pipe diameter becomes greater, the decrease or increase in the heat transfer surface areas of the space A also becomes greater when there is a changeover between manufacture of the connecting sleeve and manufacture of the corrugated wall.

According to another object, the volume of the reservoir is greater than 10 liters (standard liters). The volume is preferably greater than 20 liters. In order that the system to be controlled, comprising the compressed-gas reservoir, the gas-pressure line, the first gas channel and the space A, does not become too slow-acting, in a preferred embodiment the volume of the compressed-gas reservoir is less than 50 liters. Preferably, it may also be less than 40 liters.

Alternatively or additionally, the compressed-gas control line for generating the pressure p3 on the inner side of the second flexible tube may comprise a pressure controller which is connected to the second gas channel via a compressed-gas line which is connected to a second, additional compressed-gas reservoir for gas exchange.

BRIEF DESCRIPTION OF THE DRAWINGS

The invention is explained in more detail on the basis of an embodiment represented in the drawing, in which.

DESCRIPTION OF PREFERRED EMBODIMENTS

Figure 1:
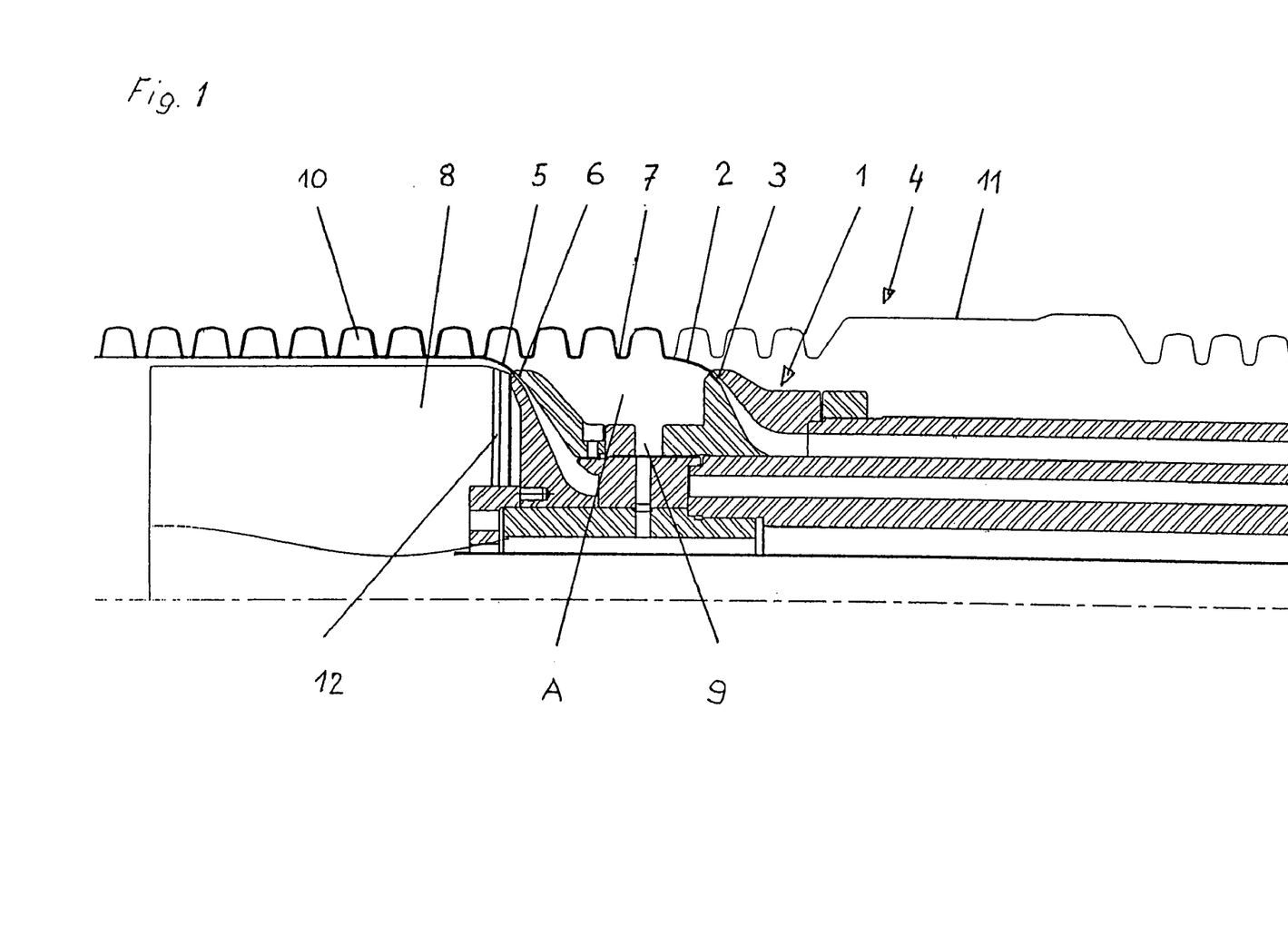
FIG. 1 shows a longitudinal section through part of an extrusion head of the device according to the invention before the manufacture of a connecting sleeve.
Figure 2:
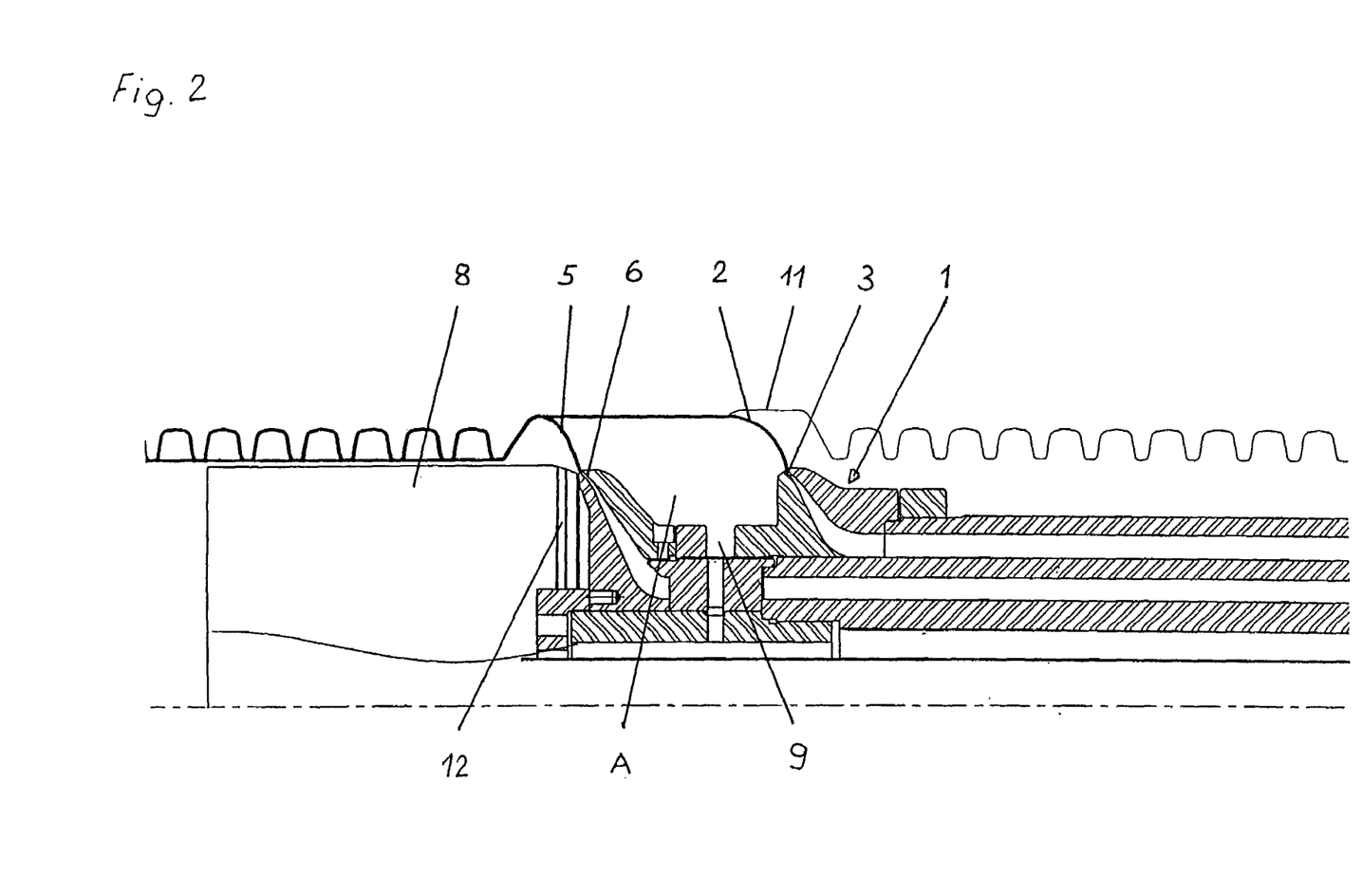
FIG. 2 shows a longitudinal section through part of the extrusion head and the molding tunnel during the extrusion of the second flexible tube into the first flexible tube, expanded into the connecting sleeve.

FIGS. 1 and 2 show an extrusion head 1 of the device according to the invention in various process steps. In the step represented in FIG. 1, a first flexible tube 2 is extruded through a first die 3 of the extrusion head 1 into a first portion of the molding tunnel 4 and brought into a corrugated form. A second flexible tube 5 is extruded through a second die 6 of the extrusion head 1 into the first flexible tube 2 and pressed against corrugation troughs 7 of the first flexible tube 2. Arranged downstream of the extrusion head 1 in the direction of production is a calibrating mandrel 8 for the second flexible tube 5.

While the first flexible tube 1 is being brought into the corrugated form and the second flexible tube 5 is being pressed against the corrugation troughs 7 of the first flexible tube 2 and fused with them, the space between the two flexible tubes 2 and 5, space A, is subjected to a pressure p1 lying above atmospheric pressure. The pressure is generated by a compressed gas which emerges from a first gas channel 9, arranged on the extrusion head 1 between the two dies 3 and 6.

The pressure p1 is set such that, after the cooling of the two flexible tubes 2 and 5, atmospheric pressure is established in the intermediate spaces 10 between the two flexible tubes, so that the second flexible tube does not have any curvatures at the points of connection with the corrugation troughs 7 of the first flexible tube 2. It must be ensured that, in the process step represented in FIG. 1, compressed gas constantly flows into the space A to maintain the pressure p1, since the intermediate spaces 10 filled with the pressure p1 extract compressed gas from the space A.

FIG. 2 shows a process situation in which the second die 6 of the extrusion head 1 has already reached a sleeve recess 11 of the molding tunnel 4, while the first flexible tube 2 is still being extruded into the sleeve recess 11. In the space A between the two flexible tubes 2 and 5 there is then a substantially constant pressure p2, which is less than p1. With the pressure p2, the first flexible tube 2 is pressed over its full surface area against the sleeve recess 11.

As FIG. 2 reveals, the pressure p2 is set such that the first flexible tube 2, extruded from the first die 3, is raised toward the sleeve recess 11, but not inflated to the extent that there is excessive stretching, which leads to a small wall thickness of the flexible tube 2 in the region of the beginning and middle of the sleeve recess 11 and a build-up of the thermoplastic material, and consequently an enlargement of the wall thickness, at the end of the sleeve recess 11 that is remote in the direction of production.

In order effectively to fuse the second flexible tube 5 with the first flexible tube 1 which has been expanded to form the connecting sleeve, in the process situation represented in FIG. 2 the second flexible tube 5 is subjected to a pressure p3 above atmospheric pressure from the inside via a second gas channel 12. The pressure p3 is set such that optimum fusing of the second flexible tube 5 with the first flexible tube 2 is ensured.

If FIGS. 1 and 2 are compared, it becomes clear that the volume of the space A varies, depending on the process step, and changes during the process. The size of the surface areas of the space A via which the amounts of heat are transported also changes in the course of the process. Both the changing of the volume and the changing of the size of the heat-transfer surface areas have an influence on the pressure in the chamber A. However, the pressure changes caused as a result are attenuated or partly equalized by the pressure cushion in the pressure reservoir according to the invention.

Figure 3:
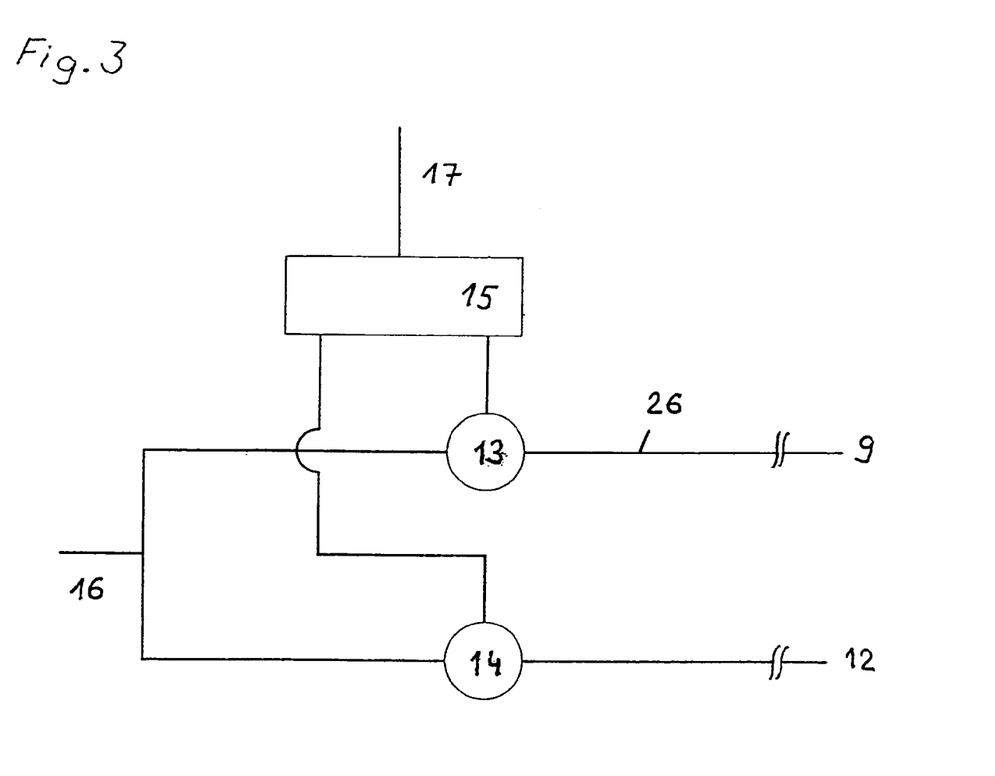
FIG. 3 schematically shows a control of the pressures p1, p2 and p3.

FIG. 3 shows the control of the pressures p1, p2 and p3 by compressed-gas control devices 13 and 14 connected to the first gas channel 9 and the second gas channel 12, by means of a control device 15 for the time-dependent switching of the compressed-gas control devices 13 and 14.

A compressed gas for generating the pressures p1, p2 and p3 is supplied to the compressed-gas control devices 13 and 14 via a compressed-gas feed 16. The compressed-gas control device 13 serves for generating the pressure p1 and the pressure p2 by the gas emerging from the mouth of the first gas channel 9 into the space A, while the compressed-gas control device 14 is provided for generating the pressure p3 to which the second flexible tube 5 is subjected from the inside by the compressed gas emerging from the mouth of the second gas channel 12. A compressed-gas line 26 connects the compressed-gas control device 13 to the first gas channel.

The time-dependent switching of the compressed-gas control devices 13 and 14 takes place by the control device 15. By means of a device not described any further here, the control device 15 receives signals via a signal supply line 17, on the basis of which the pressures p1, p2 and p3 can be set variably over time in dependence on the position of the forming tunnel in relation to the extrusion head. This allows the compressed-gas control devices to set specific pressure values for p1, p2 and p3 in dependence on the relative position of the molding tunnel.

Figure 4:
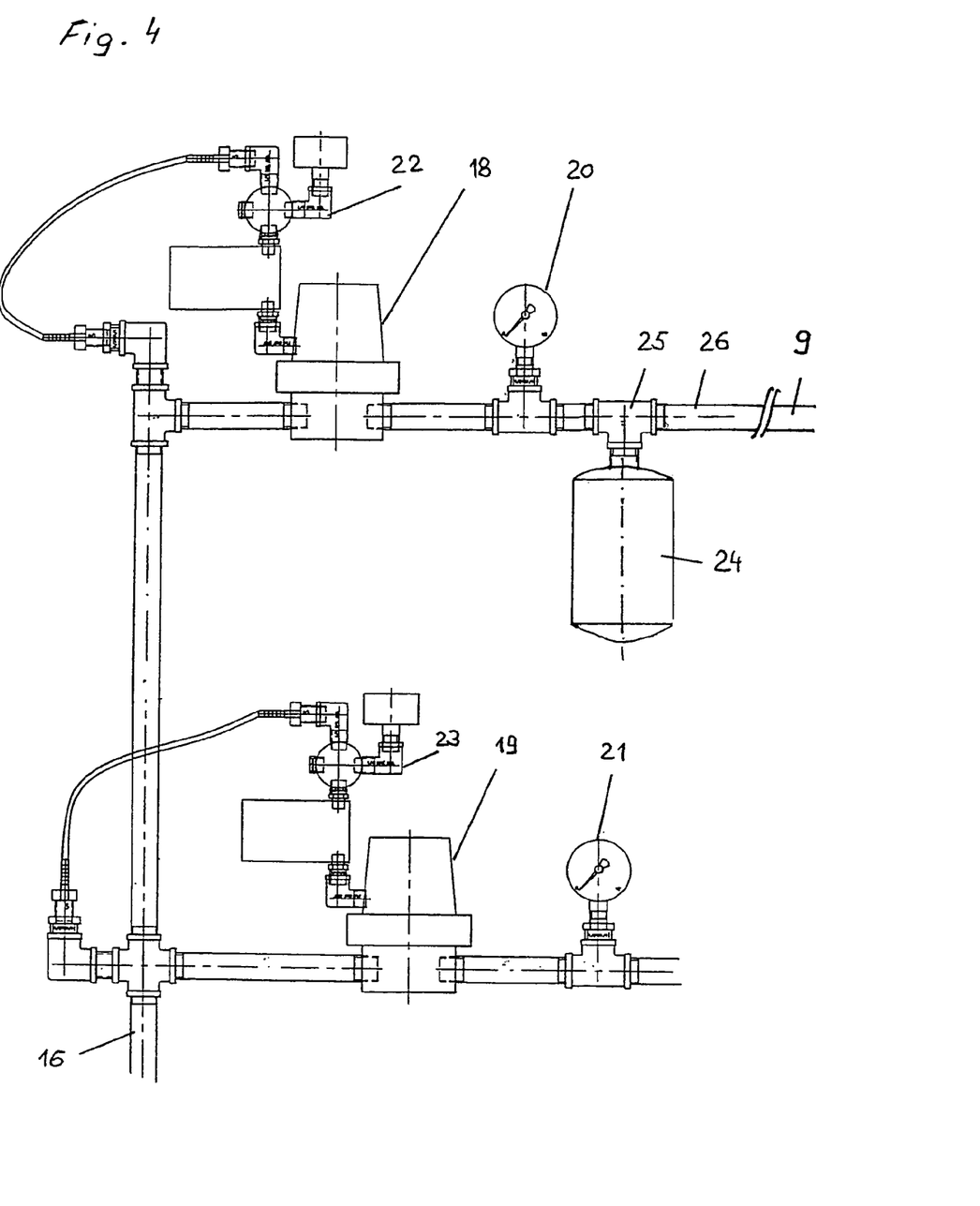
FIG. 4 shows a view of the compressed-gas control devices with a compressed-gas reservoir.

In FIG. 4, an embodiment of the compressed-gas control devices 13 and 14 for the time-dependent switching of the pressures p1, p2 and p3 is represented. The compressed gas required for setting the pressures p1, p2 and p3 is supplied via the compressed-gas feed 16. This is connected via branches to pressure controllers 18 and 19. Downstream of the pressure controllers 18 and 19, the gas pressure emerging from the latter is measured by pressure gages 20 and 21, respectively, and indicated to an actuating unit (not represented in detail in FIG. 4) inside the pressure controllers 18 and 19. Since, as FIG. 4 reveals, the actuating units are operated with the aid of the compressed gas provided by the compressed-gas feed 16, but at a lower pressure value, pressure reducers 22 and 23 are required.

Arranged downstream of the pressure controller 18 and the pressure gage 20 is a compressed-gas vessel 24, which is connected by a T-sleeve 25 to a compressed-gas line 26. The compressed-gas line 26 connects the pressure controller 18 to the first gas channel 9.

In the case of the embodiment represented here, the compressed-gas control device controls via the pressure controller 18 the pressure in a system which comprises the compressed-gas line 26, the vessel 24, the first gas channel 9 and the space A. An approximately equal pressure prevails in the compressed-gas vessel 24 and in the space A, since they can communicate with each other without any appreciable flow resistances. Consequently, pressure changes in the space A are attenuated by the pressure cushion in the compressed-gas vessel. Attenuation of this type facilitates the suitable control of the pressures p1 and p2 and consequently the manufacture of double-walled pipes with a connecting sleeve.

To summarize, the new device for manufacturing a double-walled thermoplastic pipe with a connecting sleeve has a molding tunnel with a succession of molds for forming a corrugated molding wall and a connecting sleeve, respectively. An extrusion device extrudes a first flexible tube into said molding tunnel and a second flexible tube into said first flexible tube. A first gas channel is arranged for generating a pressure between said first and second flexible tubes. A compressed-gas control device is connected to said first gas channel for generating a pressure p1 or a pressure p2 in said space between said first and second flexible tubes by compressed air emerging from said first gas channel. A second compressed-gas control device is connected to a second gas channel for guiding compressed gas onto an inner side of said second flexible tube. Said first pressure controller is connected to said first gas channel via a compressed-gas line that is connected to an additional compressed-gas reservoir for gas exchange therewith.

LIST OF REFERENCE NUMERALS 1 extrusion head
2 first flexible tube
3 first die
4 molding tunnel
5 second flexible tube
6 second die
7 troughs-+
8 calibrating mandrel
9 first gas channel
10 intermediate space
11 sleeve recess
12 second gas channel
13 compressed-gas control device
14 compressed-gas control device
15 control device
16 compressed-gas feed
17 signal supply line
18 pressure controller
19 pressure controller
20 pressure gauge
21 pressure gauge
22 pressure reducer
23 pressure reducer
24 compressed-gas vessel
25 T-sleeve
26 compressed-gas line
A space between flexible tubes 2 and 5

Therefore, what is claimed is:

1. A device for manufacturing a double-walled thermoplastic pipe with a connecting sleeve comprising:
  a molding tunnel formed by a succession of molds guided on a path, at least a first portion of said molding tunnel having a corrugated molding wall, and at least a second portion of the molding tunnel having a sleeve recess corresponding to said connecting sleeve,
  an extrusion device provided with an extrusion head, said extrusion head having a first die for extruding a first flexible tube into said molding tunnel, and a second die that is arranged downstream in direction of movement of said molds within said molding tunnel, for extruding a second flexible tube,
  a first gas channel arranged between said two dies, and a second gas channel that opens out downstream of said second die in the direction of movement of said molds of said molding tunnel,
  a compressed-gas feed,
  a first compressed-gas control device that is connected to said compressed-gas feed and said first gas channel for generating a pressure p1 or a pressure p2 in a space formed between said first flexible tube and said second flexible tube by compressed air emerging from said first gas channel, said first compressed-gas control device comprising a pressure controller,
  a second compressed-gas control device connected to said compressed-gas feed and said second gas channel for generating a pressure p3 on an inner side of said second flexible tube by compressed gas emerging from said second gas channel, said pressure p3 lying above atmospheric pressure, and
  a control device for controlling the first and second compressed-gas control devices,
  said first compressed-gas control device being connected to said first gas channel via a compressed-gas line that is connected to a compressed-gas reservoir for gas exchange therewith.

2. The device of claim 1, wherein said compressed-gas reservoir is formed as a separate compressed-gas vessel.

3. The device of claim 1, wherein said compressed-gas line has a flow cross section that is extended at least in partial regions to form said compressed-gas reservoir.

4. The device of claim 2, wherein said separate compressed-gas vessel is connected to said compressed-gas line via a T-shaped sleeve.

5. The device of claim 4, wherein said compressed-gas vessel is releasably connected to said T-shaped sleeve.

6. The device of claim 2, wherein said compressed-gas vessel comprises two supply lines and is connected in series with said compressed-gas line.

7. The device of claim 2, wherein the compressed-gas vessel comprises two supply lines and is connected in parallel with said compressed-gas line.

8. The device of claim 1, wherein the compressed-gas reservoir is arranged in the vicinity of said first gas channel.

9. The device of claim 1, where said first compressed-gas control device comprises a pressure gauge arranged upstream of said compressed-gas reservoir.

10. The device of claim 1, wherein a safety valve is connected between said first compressed-gas control device and said first gas channel.

11. The device of claim 1, wherein said molding wall in said first portion of said molding tunnel has an outer diameter that is greater than 500 mm.

12. The device of claim 1, wherein said compressed-gas reservoir has a volume that is greater than 10 liters.

13. The device of claim 1, wherein said compressed-gas reservoir has a volume that is less than 60 liters.

14. The device of claim 12, wherein said compressed-gas reservoir has a volume that is less than 50 liters.

15. The device of claim 1, wherein said second compressed-gas control device comprises a pressure controller connected to said second gas channel via a compressed-gas line that is connected to a second compressed-gas reservoir for gas exchange therewith.

16. The device of claim 1, wherein said molding wall in said first portion of said molding tunnel has an outer diameter that is greater than 800 mm.

17. The device of claim 1, wherein said compressed-gas reservoir has a volume that is greater than 20 liters.

18. A device for use with a molding tunnel having molds to form double-walled thermoplastic pipe with a connecting sleeve, said device comprising:
  an extrusion device provided with an extrusion head, said extrusion head having a first die for extruding a first flexible tube into said molding tunnel, and a second die that is arranged downstream in direction of movement of said molds within said molding tunnel, for extruding a second flexible tube,
  a first gas channel arranged between said two dies, and a second gas channel that opens out downstream of said second die in the direction of movement of the molds of the molding tunnel,
  a first compressed-gas control device that is connected to said first gas channel for generating a pressure p1 or a pressure p2 in a space formed between said first flexible tube and said second flexible tube by compressed air emerging from said first gas channel, said first compressed-gas control device comprising a pressure controller,
  a compressed-gas line connecting said first pressure controller and said first gas channel,
  a compressed-gas reservoir connected to said compressed-gas line between the said first compressed-gas control device and said first gas channel, said compressed-gas reservoir and said first compressed-gas control device are in fluid communication with said first gas channel, a second compressed-gas control device connected to said second gas channel for generating a pressure p3 on an inner side of said second flexible tube by compressed gas emerging from said second gas channel, said pressure p3 lying above atmospheric pressure, and a control device for controlling the first and second compressed-gas control devices.

19. The device of claim 18, wherein said compressed-gas reservoir is formed as a separate compressed-gas vessel.

20. The device of claim 19, wherein said compressed-gas vessel is connected to said compressed-gas line via a T-shaped sleeve.

21. The device of claim 19, wherein said compressed-gas vessel comprises two supply lines and is connected in series with said compressed-gas line.

22. The device of claim 19, wherein said compressed-gas vessel comprises two supply lines and is connected in parallel with said compressed-gas line.

23. The device of claim 18, wherein said compressed-gas line has a flow cross section that is extended at least in partial regions to form said compressed-gas reservoir.

24. The device of claim 18, where said first compressed-gas control device comprises a pressure gauge arranged upstream of said compressed-gas reservoir.

25. The device of claim 19, wherein said compressed-gas reservoir has a volume that is greater than 10 liters.

26. The device of claim 19, wherein said compressed-gas reservoir has a volume that is less than 60 liters.

* * * * *